T. H. STOUGH.
KITCHEN UTENSIL.
APPLICATION FILED MAR. 16, 1914.
1,133,413.
Patented Mar. 30, 1915.
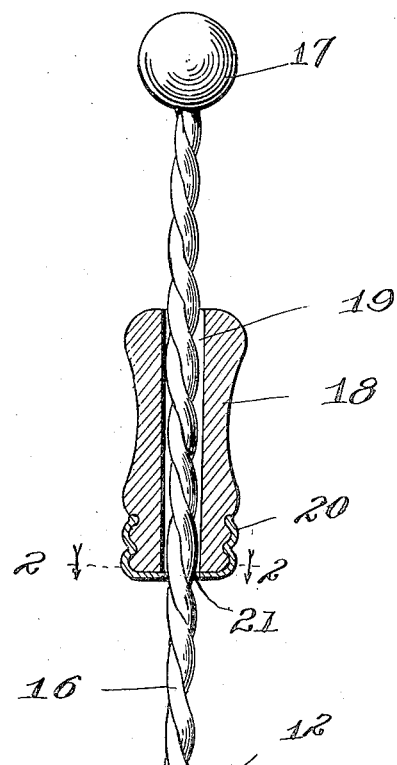
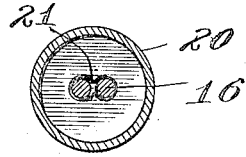
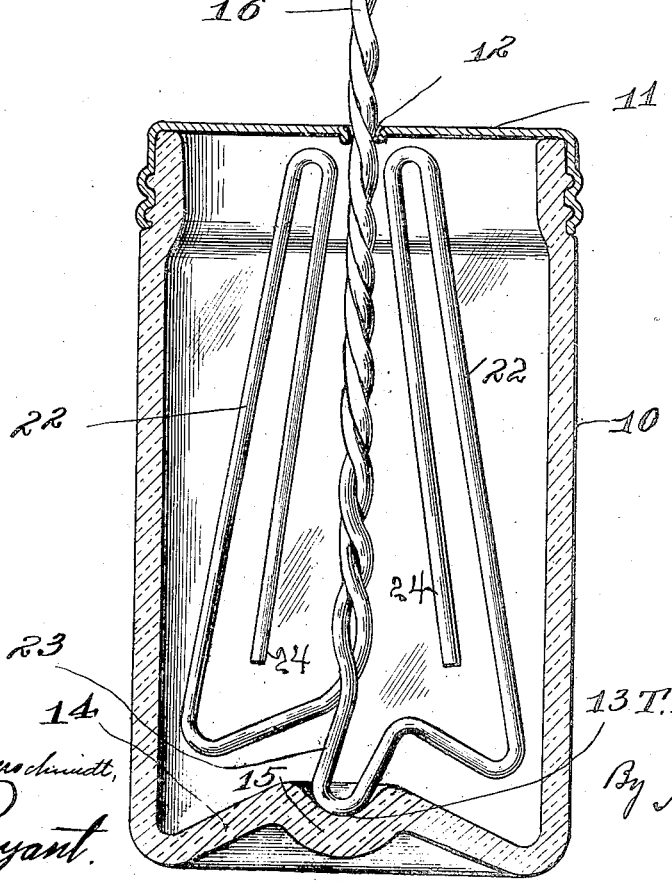
Witnesses
Inventor
T. H. Stough
By A. M. Wilson
Attorney

UNITED STATES PATENT OFFICE.

TURNEY H. STOUGH, OF JEANNETTE, PENNSYLVANIA.

KITCHEN UTENSIL.

1,133,413.     Specification of Letters Patent.     Patented Mar. 30, 1915.

Application filed March 16, 1914. Serial No. 825,008.

*To all whom it may concern:*

Be it known that I, TURNEY H. STOUGH, a citizen of the United States of America, residing at Jeannette, in the county of Westmoreland and State of Pennsylvania, have invented certain new and useful Improvements in Kitchen Utensils, of which the following is a specification.

This invention relates to improvements in kitchen utensils and more especially to a combined mixer, beater and whipper.

The primary object of the invention is to provide an implement for use in beating, whipping and mixing ingredients for use in pastry making and cooking which shall consist of few parts which are readily taken apart and easily cleaned.

A further object is to provide such a device having increased efficiency and which at the same time is easy and cheap to manufacture.

A still further object is to provide a receptacle for the ingredients to be operated upon which is formed in a manner to provide a trunnion for the operating mechanism while the movable element consists of a single piece of wire arranged in advantageous loops and coils for perfectly whipping and beating the matter within the container.

With these general objects in view and others that will appear as the nature of the invention is better understood, the same consists in the novel combination and arrangement of parts hereinafter fully described, illustrated in the accompanying drawings and pointed out in the appended claim.

In the drawings forming a part of this application and in which like numerals refer to corresponding parts throughout the several views: Figure 1 is a central vertical sectional view through the device, and Fig. 2 is a transverse sectional view upon line 2—2 of Fig. 1.

Referring in detail to the drawings, the jar 10 is provided preferably of glass although obviously any vitreous or other material may be employed in its manufacture. A screw threaded cap 11 provided with a central perforation 12 forms a closure for the jar being preferably screw-threaded exteriorly of the latter and thus leaving the interior of the jar substantially uninterrupted and without any uneven surfaces, the absence of which facilitates the cleaning of the same after use. In forming the jar a depression or socket 13 is provided in the center of the bottom 14 thereof while said bottom is preferably raised as illustrated for accommodating the central socket portion 15.

The whipping member consists of a single piece of wire twisted for forming a shaft 16 which extends through the cap perforation 12 and has the handle or limiting knob 17 secured to the top thereof. A reciprocating hand block 18 is provided with a longitudinal bore 19 through which is passed the shaft 16 while a ferrule 20 mounted upon one end of the block 18 has a central oblong slot 21 having central indrawn sides to closely though slidably surround the double wires forming the shaft 16. By this description, it will be evident that upon forcibly elevating and lowering the hand block 18, that the shaft 16 will be revolved in alternate directions upon each reciprocation of the block.

The wires of the shaft are looped and bent back upon each other at the lower end of the shaft thus forming the beating blades 22 below the cap and within the jar. A separate blade 20 is provided by the bent end portion of each wire which makes up the shaft 16 and while only two wires are illustrated in the present drawings, it is obvious that a different number thereof may be utilized with the accompanying different number of blades as made up from the free end portions thereof. It is also to be noted that one of the wires of the shaft and which forms one of the blades 20 is bent into a terminal loop 23 serviceable as a foot and as a trunnion for the shaft and blades, the said foot being seated for rotation in the socket 13 heretofore described. The blades 22 comprise upwardly and backwardly bent portions formed with terminals 24 which are parallel to the main members of the blades 22 which blades are upwardly convergent. The foot 23 may be positioned in the socket 13 somewhat angularly if desired to give a variation to the movement of the blades upon rotation.

While the forms of the invention herein shown and described are what are believed to be preferable embodiments thereof, it is nevertheless to be understood that minor changes may be made in the form, proportion and details of construction without departing from the spirit and scope of the invention as claimed.

I claim:—

In a device of the kind described, an agitator including a plurality of wires twisted to form a shank and connected at their upper ends, one of the wires being bent abruptly outward from the lower end of the shank, a second wire being bent slightly outward from the lower end of the shank and rebent upon itself to form a substantially U-shaped portion having its bight forming a foot bearing in alinement with the axis of the shank, said last wire being bent outward from said U-shaped portion at an angle to the axis of the shank similar to the abruptly bent portion of the first wire, the ends of said wire being convoluted to form beater blades; in combination with a jar having a frusto-conical bottom, the sides of the frusto-cone being arranged substantially parallel to the outwardly bent portions of the beater and the top of the frusto-cone being recessed to receive the foot bearing.

In testimony whereof I affix my signature in presence of two witnesses.

TURNEY H. STOUGH.

Witnesses:
JOHN GANDY,
H. V. ROWAN.